United States Patent
Berman et al.

(10) Patent No.: US 8,054,582 B2
(45) Date of Patent: *Nov. 8, 2011

(54) AIR BEARING AT OPPOSITE SIDE OF LINEAR TAPE TO SUPPORT TAPE INTO CONTACT WITH HEAD SLIDER

(75) Inventors: David Berman, San Jose, CA (US); William Marvin Dyer, San Jose, CA (US); Wayne Isami Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 801 days.

This patent is subject to a terminal disclaimer.

(21) Appl. No.: 12/056,198

(22) Filed: Mar. 26, 2008

(65) Prior Publication Data

US 2009/0052087 A1  Feb. 26, 2009

Related U.S. Application Data

(63) Continuation of application No. 11/843,990, filed on Aug. 23, 2007, now Pat. No. 7,869,163.

(51) Int. Cl.
*G11B 5/60* (2006.01)

(52) U.S. Cl. .................. 360/130.31; 360/231

(58) Field of Classification Search .......... 360/231, 360/130.31, 130.32, 130.33
See application file for complete search history.

(56) References Cited

U.S. PATENT DOCUMENTS

| | | | |
|---|---|---|---|
| 3,435,441 A | 3/1969 | Stahler | |
| 3,979,037 A * | 9/1976 | Burdorf | 242/615.12 |
| 4,379,316 A | 4/1983 | Krane | 360/105 |
| 4,459,626 A | 7/1984 | Branger | 360/130.22 |
| 4,894,740 A | 1/1990 | Chhabra et al. | 360/103 |
| 6,466,409 B1 | 10/2002 | Baba et al. | 360/236.3 |
| 6,477,014 B1 | 11/2002 | Erpelding | 360/245.9 |
| 6,707,646 B2 | 3/2004 | Berger et al. | 360/294.7 |
| 6,760,198 B2 | 7/2004 | Jarratt | 360/319 |
| 6,876,507 B2 | 4/2005 | Chen et al. | 360/71 |
| 6,909,581 B2 | 6/2005 | Gavit et al. | 360/231 |
| 2003/0076772 A1 | 4/2003 | Brewen | 369/258 |
| 2006/0007596 A1 | 1/2006 | Gavit et al. | 360/231 |

* cited by examiner

*Primary Examiner* — Jefferson Evans
(74) *Attorney, Agent, or Firm* — John H. Holcombe

(57) ABSTRACT

A tape head and bearing assembly comprises an air bearing structure having a tape bearing surface with a plurality of openings therein configured to provide a continuous air bearing of pressurized air to support a linear tape moving along a path, the air bearing being provided on only one side of the linear tape. A head slider assembly, such as an HDD-type assembly, is positioned at the opposite side of the linear tape from the tape bearing surface and is configured to be in contact with the linear tape.

19 Claims, 6 Drawing Sheets

US 8,054,582 B2

AIR BEARING AT OPPOSITE SIDE OF LINEAR TAPE TO SUPPORT TAPE INTO CONTACT WITH HEAD SLIDER

CROSS REFERENCE TO RELATED APPLICATION

The present application is a continuation of parent application Ser. No. 11/843,990, filed Aug. 23, 2007, now U.S. Pat. No. 7,869,163.

FIELD OF THE INVENTION

This invention relates to tape, for example tape that may be employed for magnetic recording, and, more particularly, to the interface between the tape and a tape head.

BACKGROUND OF THE INVENTION

Tape, for example magnetic linear tape, may provide a means of recording data to be saved and read back at a subsequent time. The elements of the head to conduct the recording and read back of the data may share technologies with those of HDDs (Hard Disk Drives), but the higher volume of HDDs is accompanied by an economy of scale that may be used to advantage with magnetic linear tape. HDDs and linear tape differ in technology at the interface with respect to the head. An HDD is designed to position a head in proximity to a rigid substrate in which the head at least theoretically flies at a controlled flying height above the surface.

Linear tape is instead a flexible substrate, and the typical tape head is rigid. The flexible tape is moved along a linear tape path and across, and at least theoretically in contact with, the rigid head.

SUMMARY OF THE INVENTION

Tape head assemblies, tape drive assemblies, tape-head interface apparatus and methods are provided for supporting linear tape in contact with tape heads.

In one embodiment, a tape head and bearing assembly comprises an air bearing structure having a tape bearing surface with a plurality of openings therein configured to provide a continuous air bearing of pressurized air to support linear tape moving along a path, the air bearing provided on only one side of the tape; and a head slider assembly positioned on the side of the linear tape opposite from the tape bearing surface, the assembly configured to be in contact with the linear tape.

In a further embodiment, the elongated tape bearing surface comprises a convex curved cylindrical surface elongated in the linear direction of the path.

In another embodiment, the head slider assembly comprises an HDD-type assembly supported by a suspension arm assembly and configured to be in contact with the linear tape.

In a further embodiment, the air bearing structure additionally comprises an air plenum wherein the plurality of openings are configured to provide paths for pressurized air between the air plenum and the tape bearing surface.

In a still further embodiment, a source of pressurized air is configured to supply the pressurized air to the air plenum.

In another embodiment, a tape-head interface apparatus comprises an air bearing structure comprising a tape bearing surface with a plurality of openings therein and an air plenum, wherein the plurality of openings are configured to provide paths for pressurized air between the air plenum and the tape bearing surface, the air bearing configured to provide an air bearing of pressurized air to support linear tape moving along a path, the air bearing provided on only one side of the linear tape; a source of pressurized air configured to supply the pressurized air to the air plenum; a head slider assembly positioned at the side of the linear tape opposite from the tape bearing surface and configured to be in contact with the linear tape; and a drive spindle configured to move the linear tape along the path, the path arranged in a continuous closed loop encompassing the tape bearing surface and the drive spindle.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
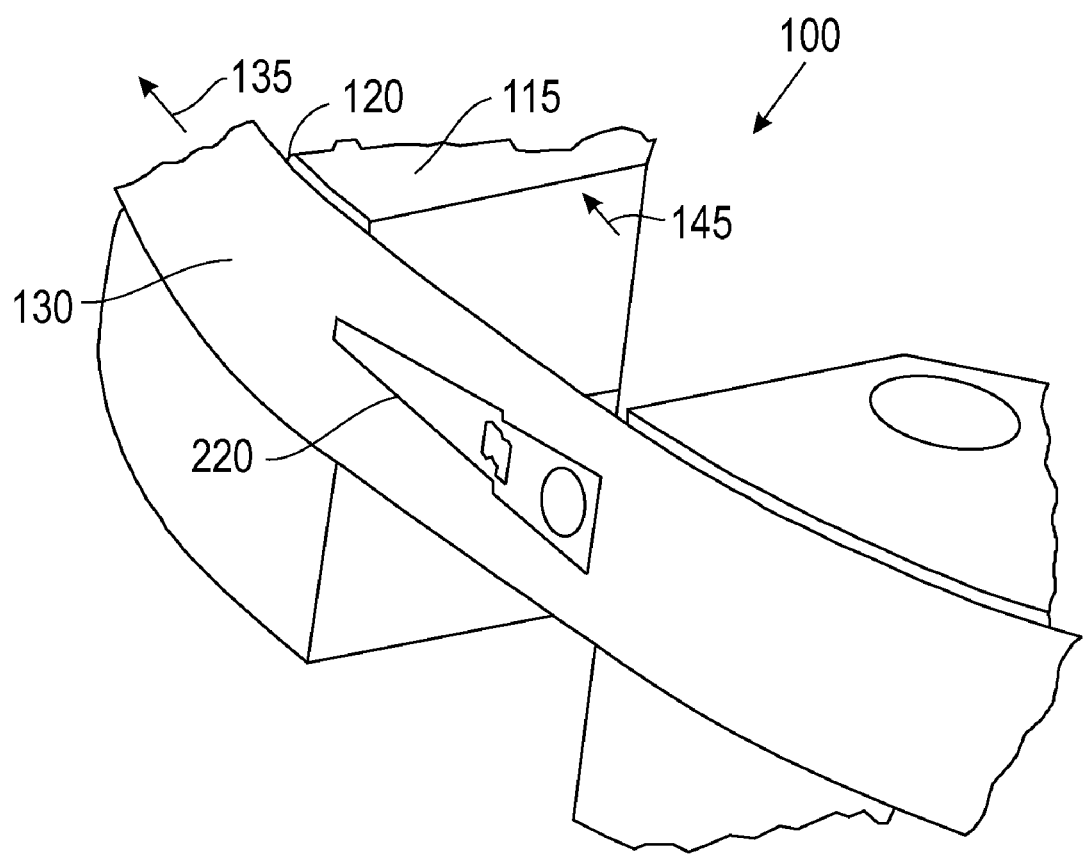
FIG. 1 is a diagrammatic illustration of a tape and head interface assembly in accordance with the present invention.
Figure 2:
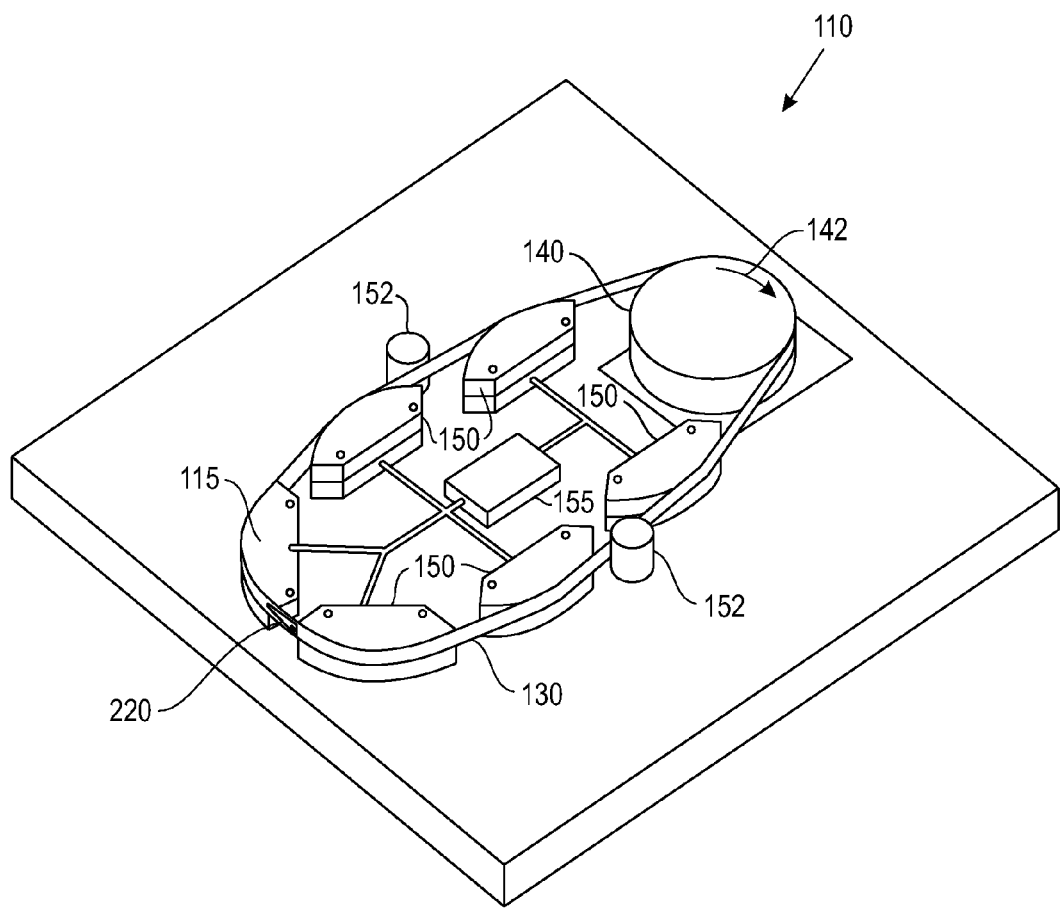
FIG. 2 is a diagrammatic illustration of a tape drive assembly employing the tape and head interface assembly of FIG. 1.

Referring to FIGS. 1 and 2, a tape-head interface 100 of a tape drive assembly 110 is illustrated employing an air bearing structure 115 having a tape bearing surface 120 configured to provide a continuous air bearing of pressurized air to support a linear tape 130 moving along a path 135, the air bearing provided on only one side of the linear tape.

A drive spindle 140 is configured to move the linear tape 130 along the path 135. For example, the spindle 140 rotates in the clockwise direction 142 to move the linear tape 130 in a continuous closed loop in the direction of arrow 145, the closed loop encompassing the tape bearing surface 120 and the drive spindle 140. Additional air bearings 150 may be placed along the linear tape path 135, and one or more idle rollers 152 may be employed to control the tension of the linear tape. Alternatively, a drive may be employed to move the linear tape between a supply reel and a take-up reel. A source of pressurized air 155, such as an air pump, provides pressurized air to each of the air bearings 115, 150.

Figure 3:
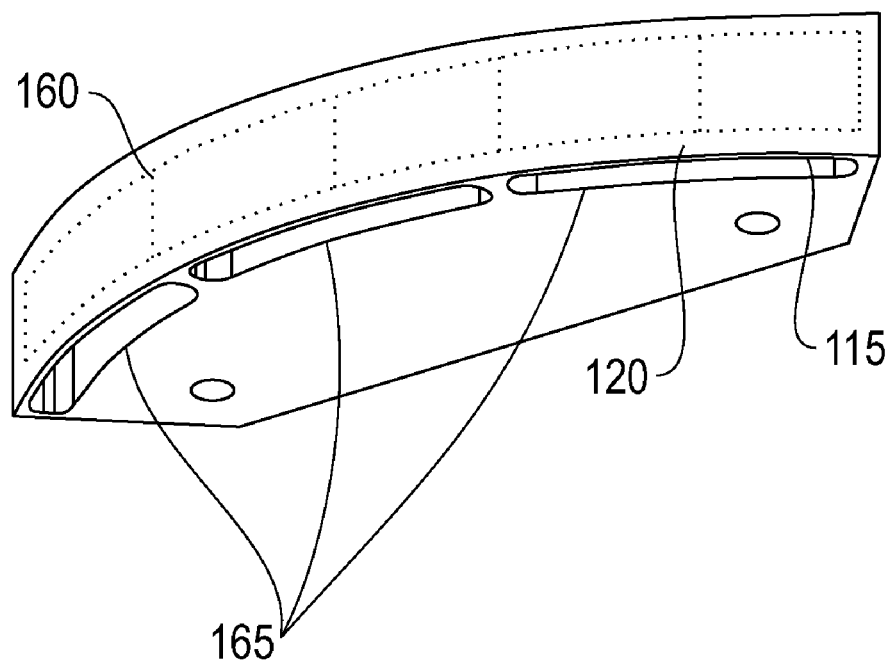
FIG. 3 is a cut away view of the air plenum and air bearing surface of the tape and head interface assembly of FIG. 1.
Figure 4:
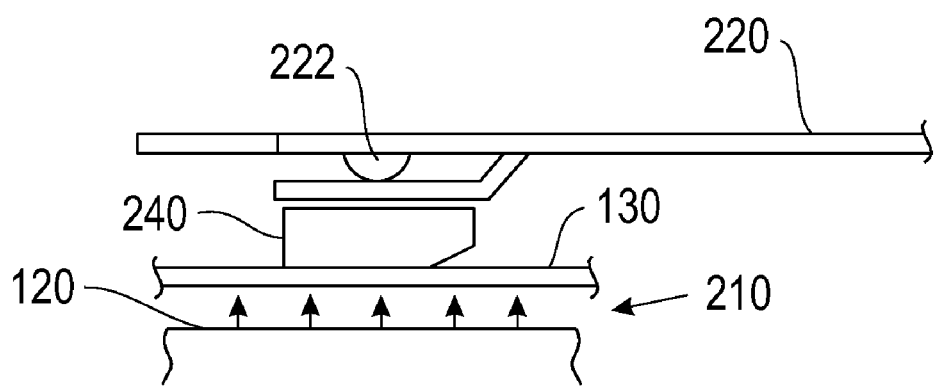
FIG. 4 is side view of a head slider assembly of the tape and head interface of FIG. 1.

Referring additionally to FIG. 3, the air bearing structure 115 comprises a tape bearing surface 120 with a plurality of openings 160 therein configured to provide an air bearing of pressurized air to support a linear tape. The air bearing structure additionally comprises an air plenum 165, which may comprise one or more compartments, supplied by the source of pressurized air 155, and the plurality of openings 160 are configured to provide paths for pressurized air between the air plenum 165 and the tape bearing surface 120.

The tape bearing surface 120 may be arranged in a convex curved cylindrical surface elongated in the linear direction of the linear tape path 135. The term "convex curved cylindrical surface" encompasses a perfect cylindrical surface, an annular cylindrical surface, or a cylindrical surface having a variable radius.

Figure 5:
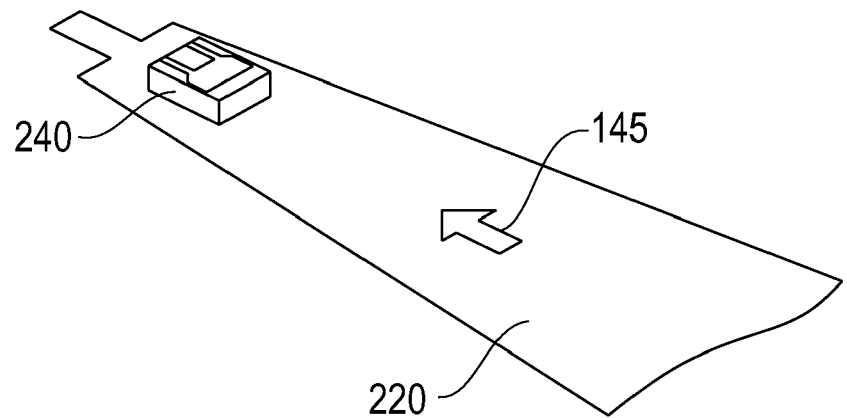
FIG. 5 is an isometric diagrammatic illustration of the head slider assembly of FIG. 4.
Figure 6:
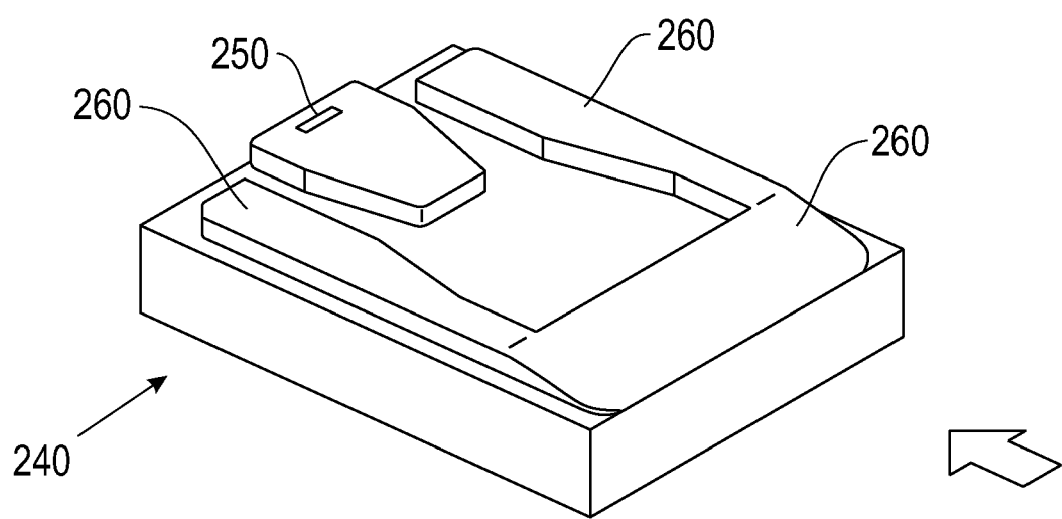
FIG. 6 is an isometric diagrammatic illustration of the head slider of the head slider assembly of FIG. 5.
Figure 7:
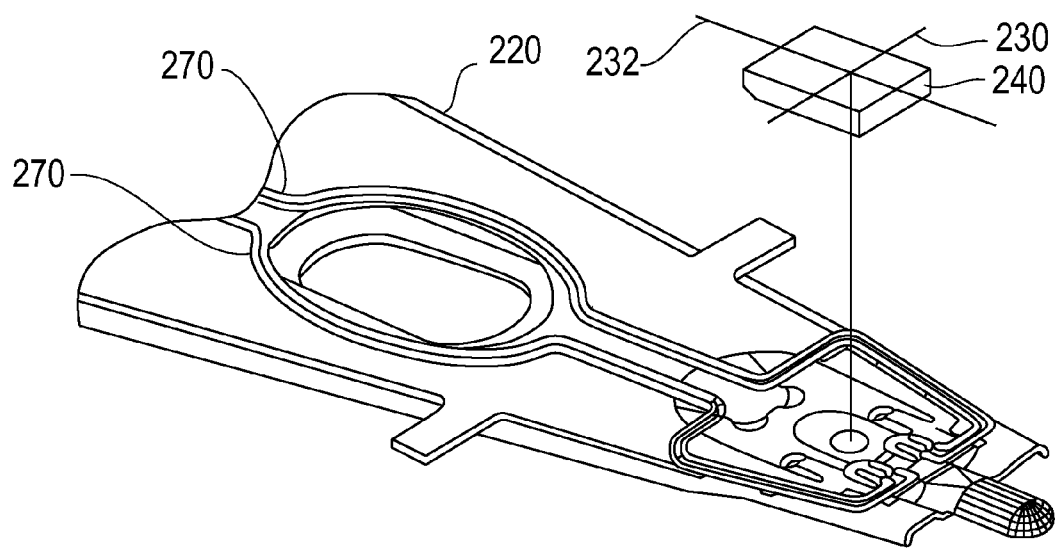
FIG. 7 is an isometric view of the arm and head slider of the head slider assembly of FIG. 5.

Referring additionally to FIGS. 4, 5, 6, and 7, a head slider assembly 240 mounted on a suspension arm assembly 220 is positioned at the opposite side of the linear tape 130 from the tape bearing surface 120. (FIGS. 5 and 6 illustrate the head slider assembly 240 from the viewpoint of the linear tape 130.) The air bearing 210 of pressurized air at the tape bearing surface 120 supports the linear tape 130 on only one side of the tape and into contact with the head slider assembly 240. The suspension arm assembly may comprise a gimbal 222 that allows the head slider assembly to pivot about both the "X" axis 230 and the "Y" axis 232 to follow the linear tape 130 as it may vary in position or attitude as it is moved in direction 145.

The head slider assembly may comprise an HDD-type assembly with a head 250 configured for reading and writing information with respect to a magnetic media. The head may also comprise a plurality of rails 260 for supporting the head slider assembly in contact with the linear tape 130, for example, forming an area of support with the head 250 to maintain stability of the HDD-type assembly. In one arrangement of HDD-type assemblies, the rails form a negative pressure area around the head 250 to draw the head into contact with the linear tape, requiring less pressure from the suspension arm assembly 220. Alternative arrangements of the rails and the head 250 may be provided by HDD-type assemblies including those not having a negative pressure area. Cabling 270 may be configured to provide communication with the head 250 for reading and writing information with respect to the magnetic linear tape.

Figure 8:
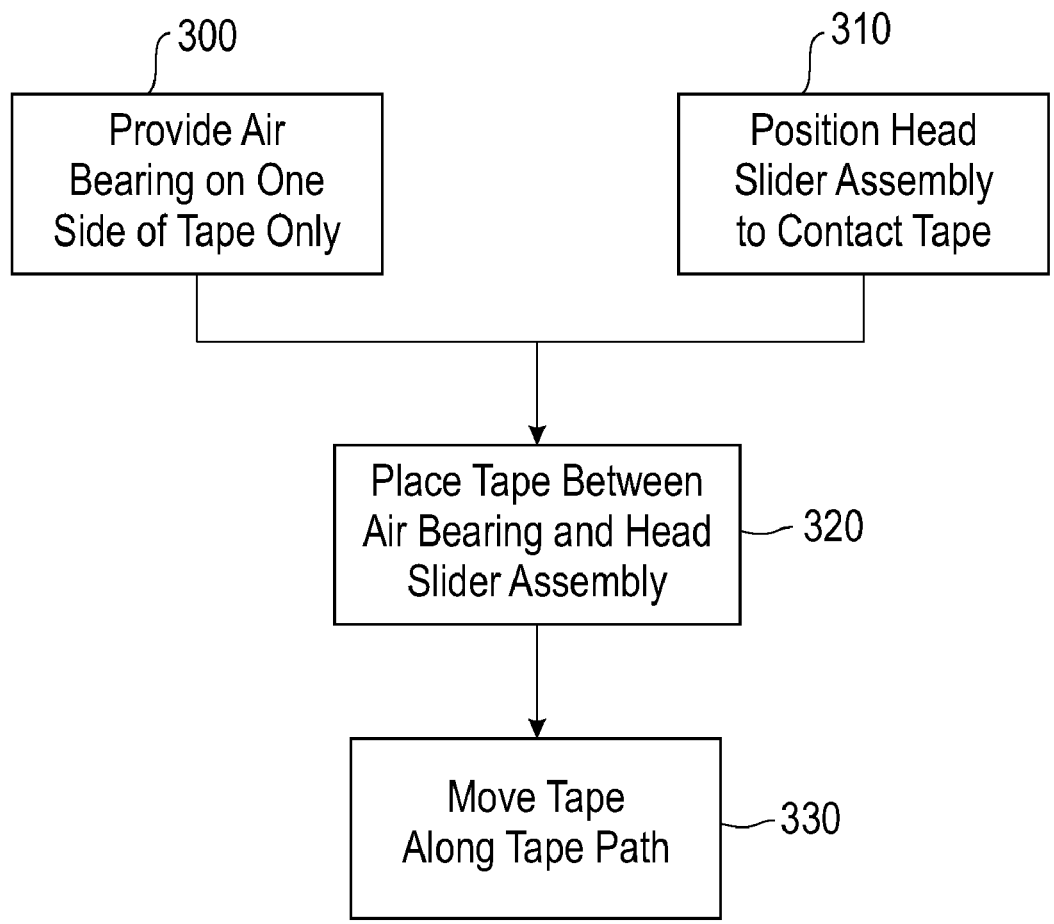
FIG. 8 is a flow chart depicting a method in accordance with the present invention.

Referring additionally to FIG. 8, in step 300, the air bearing structure 115 having a tape bearing surface 120 with a plurality of openings 160 therein is configured to provide a continuous air bearing 210 of pressurized air to support a linear tape moving along a path, the air bearing on only one side of the linear tape; and, in step 310, the head slider assembly 240 is positioned at the side of the linear tape 130 opposite from the tape bearing surface 120. In step 320, the linear tape 130 is placed between the tape bearing surface 120 of the air bearing structure 115 and the head slider assembly 240, and the air bearing 210 is generated by the source of pressurized air 155 via openings 160 in the tape bearing surface to place the linear tape in contact with the linear tape 130. In step 330, spindle 140 moves the linear tape along the tape path 135.

The linear tape 130 may comprise magnetic tape and the head slider assembly 240 may be employed to read and write information with respect to the magnetic tape, thereby storing information on the magnetic tape for subsequent retrieval. Alternatively, the linear tape may comprise a clear tape, and interferometry apparatus may be employed to evaluate the head-tape interface. Still alternatively, the linear tape may be arranged in other than a closed loop, for example with a drive to move the linear tape between a supply reel and a take-up reel.

An example of a best mode application employed for tape characterization or tape-head interface characterization comprises an air bearing structure having a curved cylindrical surface fabricated out of a ceramic, such as silicon carbide, or a metal, such as aluminium. The air plenum structure is machined into an area close to the surface, and holes of 250 microns uniformly spaced by 2 mm are drilled to provide air flow from the plenum to the surface. An air supply pressure of 5-20 psi can be supplied to the plenum. The curved cylindrical surface comprises a 60.5 mm radius and 12.7 mm width. The tape is held in a closed loop and driven by a 90 mm diameter drive spindle.

The above discussion is not intended to restrict alternative modes or examples of implementation of the present invention, such as those discussed supra.

Those of skill in the art will understand that changes may be made with respect to the embodiments illustrated herein. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A tape head and bearing assembly comprising:
an air bearing structure having a tape bearing surface with a plurality of openings therein configured to provide a continuous air bearing of pressurized air to support a linear tape moving along a path, said air bearing being provided on only one side of said linear tape; and
a head slider assembly positioned at the side of said linear tape opposite from said tape bearing surface, said assembly configured to be in contact with said linear tape directly opposite said air bearing such that said air bearing supports said linear tape into contact with said head slider assembly.

2. The tape head and bearing assembly of claim 1, wherein said tape bearing surface comprises a convex curved cylindrical surface elongated in the linear direction of said path.

3. The tape head and bearing assembly of claim 2, wherein said head slider assembly comprises an HDD-type assembly supported by a suspension arm assembly and configured to be in said contact with said linear tape.

4. The tape head and bearing assembly of claim 3, wherein said air bearing structure additionally comprises an air plenum; and wherein said plurality of openings are configured to provide paths for pressurized air between said air plenum and said tape bearing surface.

5. The tape head and bearing assembly of claim 4, additionally comprising a source of pressurized air configured to supply said pressurized air to said air plenum.

6. A tape drive assembly comprising:
an air bearing structure having a tape bearing surface with a plurality of openings therein configured to provide a continuous air bearing of pressurized air to support linear tape moving along a path, said air bearing being provided on only one side of said linear tape;
a head slider assembly positioned at the side of said linear tape opposite from said tape bearing surface, said assembly configured to be in contact with said linear tape directly opposite said air bearing such that said air bearing supports said linear tape into contact with said head slider assembly; and
a drive spindle configured to move said linear tape along said path.

7. The tape drive assembly of claim 6, wherein said tape bearing surface comprises a convex curved cylindrical surface elongated in the linear direction of said linear tape path.

8. The tape drive assembly of claim 7, wherein said head slider assembly comprises an HDD-type assembly supported by a suspension arm assembly and configured to be in said contact with said linear tape.

9. The tape drive assembly of claim 8, wherein said air bearing structure additionally comprises an air plenum; and wherein said plurality of openings are configured to provide paths for pressurized air between said air plenum and said tape bearing surface.

10. The tape drive assembly of claim 9, additionally comprising a source of pressurized air configured to supply said pressurized air to said air plenum.

11. The tape drive assembly of claim 6, additionally comprising said linear tape arranged in a continuous closed loop.

12. Tape-head interface apparatus comprising:
an air bearing structure comprising a tape bearing surface with a plurality of openings therein and an air plenum, wherein said plurality of openings are configured to provide paths for pressurized air between said air plenum and said tape bearing surface, said air bearing structure configured to provide a continuous air bearing of pressurized air to support linear tape moving along a path, said air bearing on only one side of said linear tape;
a source of pressurized air configured to supply said pressurized air to said air plenum;
a head slider assembly positioned at the side of said linear tape opposite from said tape bearing surface, said assembly configured to be in contact with said linear tape; and
a drive spindle configured to move said linear tape along said path, said path arranged in a continuous closed loop encompassing said tape bearing surface and said drive spindle.

13. The tape-head interface apparatus of claim 12, additionally comprising said linear tape arranged in said continuous closed loop and wherein said head slider assembly comprises an HDD-type assembly supported by a suspension arm assembly.

14. A method for positioning a head slider assembly in proximal contact with a linear tape comprising the steps of:
providing a single air bearing along one side only of a tape path; and
positioning said head slider assembly at said tape path opposite said single air bearing, such that placement of said linear tape between said single air bearing and said head slider assembly allows said single air bearing to support said linear tape on one side only, said single air bearing contacting said linear tape directly opposite said head slider assembly to support said linear tape into contact with said head slider assembly.

15. The method of claim 14, wherein said step of providing said single elongated air bearing comprises forming said single air bearing over a tape bearing surface having a plurality of openings therein.

16. A tape-head interface apparatus comprising:
a head slider assembly; and
a single air bearing structure positioned opposite said head slider assembly configured to provide a continuous air bearing of pressurized air; wherein a linear tape positioned between said head slider assembly and said single air bearing structure has only one surface that rides over said pressurized air bearing directly opposite said head slider assembly such that said air bearing supports said linear tape in contact with said head slider assembly.

17. The tape-head interface apparatus of claim 16, wherein said head slider assembly comprises an HDD-type assembly supported by a suspension arm assembly and configured to be in said contact with said linear tape.

18. The tape-head interface apparatus of claim 17, wherein said air bearing structure additionally comprises an air plenum, an air bearing surface, and a plurality of openings configured to provide paths for pressurized air between said air plenum and said air bearing surface to form said air bearing.

19. The tape-head interface apparatus of claim 18, additionally comprising a source of pressurized air configured to supply said pressurized air to said air plenum.

* * * * *